United States Patent
Zhang et al.

(10) Patent No.: US 8,907,519 B2
(45) Date of Patent: Dec. 9, 2014

(54) DATA TRANSMISSION SYSTEM BASED ON A POWER LINE

(75) Inventors: Ju-Yuan Zhang, Shenzhen (CN); Zhang-Yong Zheng, Shenzhen (CN); Bi-Qing Luo, Shenzhen (CN); Xin Lu, Shenzhen (CN); Shih-Fang Wong, Tu-Cheng (TW)

(73) Assignees: Fu Tai Hua Industry (Shenzhen) Co., Ltd., Shenzhen (CN); Hon Hai Presicion Industry Co., Ltd., New Taipei (TW)

( * ) Notice: Subject to any disclaimer, the term of this patent is extended or adjusted under 35 U.S.C. 154(b) by 595 days.

(21) Appl. No.: 13/217,285

(22) Filed: Aug. 25, 2011

(65) Prior Publication Data

US 2012/0219074 A1 Aug. 30, 2012

(30) Foreign Application Priority Data

Feb. 25, 2011 (CN) .......................... 2011 1 0045782

(51) Int. Cl.
*H02J 3/02* (2006.01)

(52) U.S. Cl.
USPC ............................................................. 307/3

(58) Field of Classification Search
USPC ............................................................ 307/3
See application file for complete search history.

(56) References Cited

U.S. PATENT DOCUMENTS

2006/0017324 A1\* 1/2006 Pace et al. .......................... 307/3

\* cited by examiner

*Primary Examiner* — Robert L. Deberadinis
(74) *Attorney, Agent, or Firm* — Novak Druce Connolly Bove + Quigg LLP

(57) ABSTRACT

A data transmission system includes a sender, at least one receiver, a sender controller, and a receiver controller. The sender controller receives an AC signal from an AC power source via a first AC input port, receives data from the sender via a first data port, and processes the received AC signal according to the received data, and outputs a processed AC signal via a first AC output port. The receiver controller receives the processed AC signal from the sender controller via the second AC input port, powers the at least one receiver using the processed AC signal via the second AC output port, and converts the processed AC signal to corresponding data and transmits the data to the at least one receiver via a second data port.

20 Claims, 8 Drawing Sheets

DATA TRANSMISSION SYSTEM BASED ON A POWER LINE

BACKGROUND

1. Technical Field

The present disclosure relates to data transmission systems, particularly, to a data transmission system for transmitting data via a power line.

2. Description of Related Art

Modern remote communications, such as remote control or remote data transmission, are achieved by using wireless network such as Global System for Mobile Communications (GSM) system, or by using the Internet. However, in using the GSM system and the internet, expenditures for building necessary infrastructure are often incurred and the corresponding hardware equipment must be installed, such as cable, and modem, for example, which is an economic burden.

Therefore, it is desirable to provide a data transmission system to overcome the described limitations.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
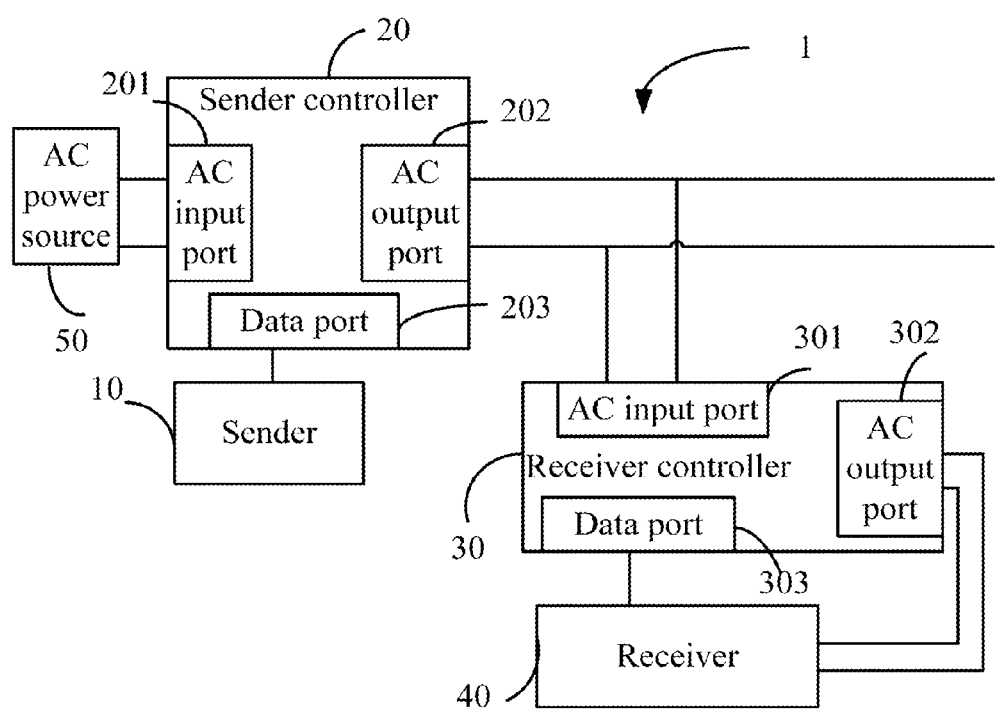
FIG. 1 is a block view of a data transmission system based on a power line, in accordance with an exemplary embodiment.

Referring to FIG. 1, a data transmission system 1 based on a power line (hereinafter, the data transmission system 1) includes a sender 10, a sender controller 20, at least one receiver controller 30, and at least one receiver 40. The sender 10 can be a computer, a mobile phone, or a digital photo frame. The sender controller 20 includes an AC (alternating current) input port 201, an AC output port 202, and a data port 203. The sender controller 20 connects to an AC power source 50 to receive an AC signal from the AC power source 50 via the AC input port 201, and connects to the sender 10 to receive data from the sender 10 via the data port 203, and processes the received AC signal according to the received data, and outputs a processed AC signal reflecting the data via the AC output port 202. Each of the at least one receiver controller 30 corresponds to one receiver 40, and includes an AC input port 301, an AC output port 302, and a data port 303. The at least one receiver controller 30 receives the processed AC signal from the sender controller 20 via the AC input port 301, and powers the receiver 40 using the processed AC signal via the AC output port 302, and converts the processed AC signal to corresponding data and transmits the data to the receiver 40 via the data port 303.

In the embodiment, the data can be image files, audio files, video files, or control signals. The data ports 202, 302 can be USB ports, serial ports, IEEE 1394 ports. The data received by the sender controller 20 from the sender 10 includes an address of a receiver 40 receiving the data. The receiver controller 30 converts the processed AC signal to corresponding data only if the receiver controller 30 determines the address of the data is the same as the corresponding receiver 40.

Figure 2:
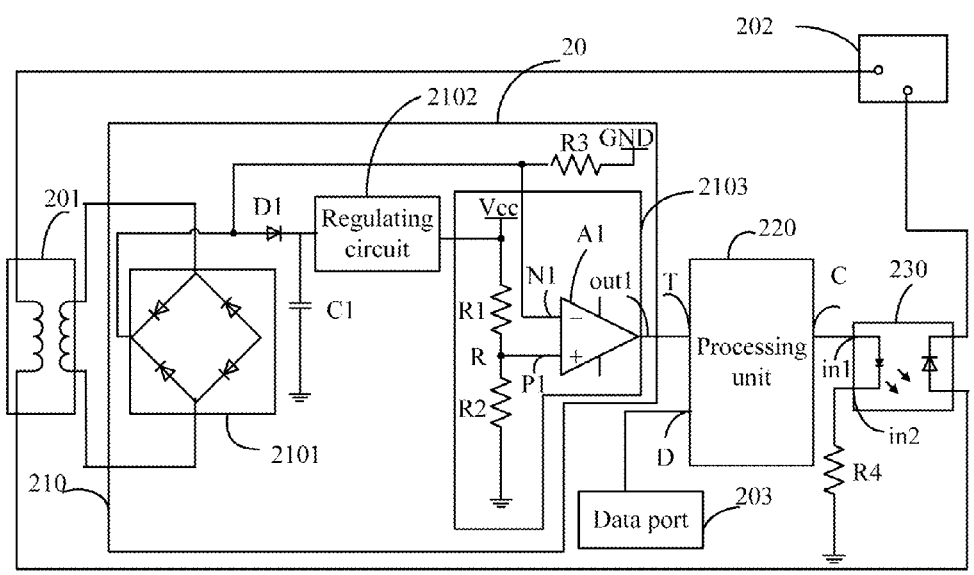
FIG. 2 is a circuit diagram of a sender controller of the data transmission system of FIG. 1.

Referring to FIG. 2, the sender controller 20 also includes a zero detection circuit 210, a processing unit 220, and a switch circuit 230. The zero detection circuit 210 detects zero point of the AC signal output by the AC power source 50, and produces an interrupt signal when detecting the zero point. As is known, the AC signal output by the AC power source 50 are periodic sine signal, the zero detection circuit 210 would detect two zero points of a cycle of the AC signal. The switch circuit 230 is connected between the AC input port 201 and the AC output port 202 of the sender controller 20, and is used to discontinue or continue the connection between the AC input port 201 and the AC output port 202. The processing unit 220 includes an interrupt pin T, a data pin D, and a control pin C. The processing unit 220 connects to the zero detection circuit 210 to receive the interrupt signal via the interrupt pin T, and connects to the data port 203 and receives the data from the sender 10 via the data pin D, and connects to an input terminal in1 of the switch circuit 230 via the control pin C.

The processing unit 220 obtains a bit of data via the data pin D every two interrupt signals are received by the interrupt pin T, and outputs a high voltage or low voltage via the control pin C according to the bit value of the received data, then turns on or turns off the switch circuit 230 accordingly. Then the AC output port 202 outputs the AC signal or stops outputting the AC signal in response to the on state or off state of the switch circuit 230, then the processed AC signal reflecting the data is produced.

If a duration that the AC output port 202 does not output the AC signals is longer than a predetermined value, the power supplied to the at least one receiver 40 cannot maintain the normal working state of the at least one receiver 40. In the embodiment, the processing unit 220 outputs a high voltage or low voltage via the control pin C to turn on or turn off the switch circuit 230 according to the bit value of the received bit of data. That is, if the interrupt pin T receives the interrupt signal, the processing unit 220 detects whether the data pin D receives data from the data port 203, and obtains a byte of data in a period of receiving predetermined number of interrupt signals which is much greater than sixteen, such as 100 interrupt signals, when determining the data pin D receives the data. In detail, during the time that the processing unit 220 receives sixteen continuous interrupt signals selected from the predetermined number of interrupt signals, the processing unit 220 receives a bit data at every two interrupt signals. The processing unit 220 outputs an on signal to the input terminal in1 of the switch circuit 230 to turn on the switch circuit 230 if the bit value of the received bit is "1", and outputs an off signal to the input terminal in1 of the switch circuit 230 to turn off the switch circuit 230 if the bit value of the received bit is "0".

In the embodiment, the processing unit 220 turns on the switch circuit 230 when receiving other interrupt signals of the predetermined number of interrupt signals. For example, if the predetermined number of the interrupt signals is 100, the processing unit 220 only controls the switch circuit 230 to turn on or turn off according the bit value of the obtained data during the period of receiving the sixteen interrupt signals of the predetermined number of interrupt signals, the processing unit 220 turns on the switch circuit 230 when receiving other interrupt signals of the predetermined number of interrupt signals. Therefore, the power supplied to the receiver 40 is unaffected.

Figure 3A:
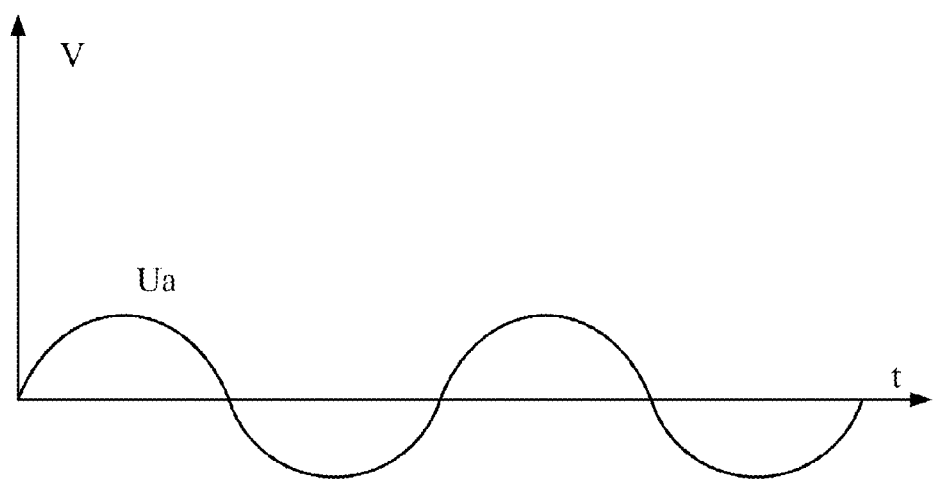
FIGS. 3A-3C are a series of schematic wave graphs illustrating changes of an alternating current processed by the sender controller of FIG. 2.
Figure 3B:
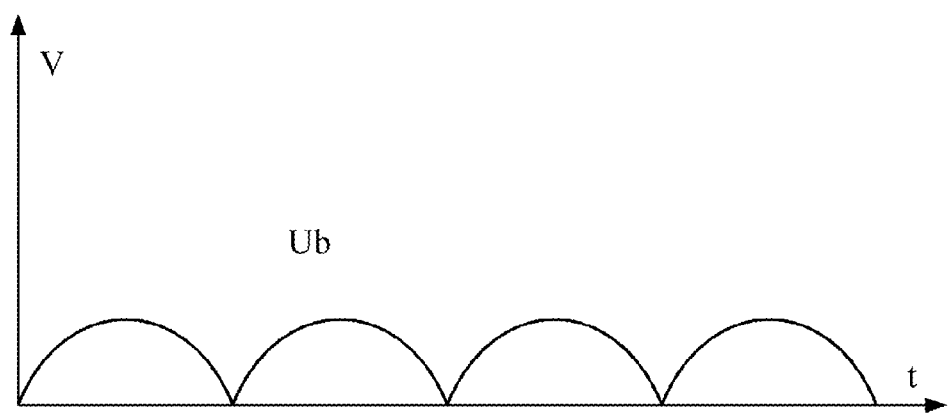
Figure 3C:
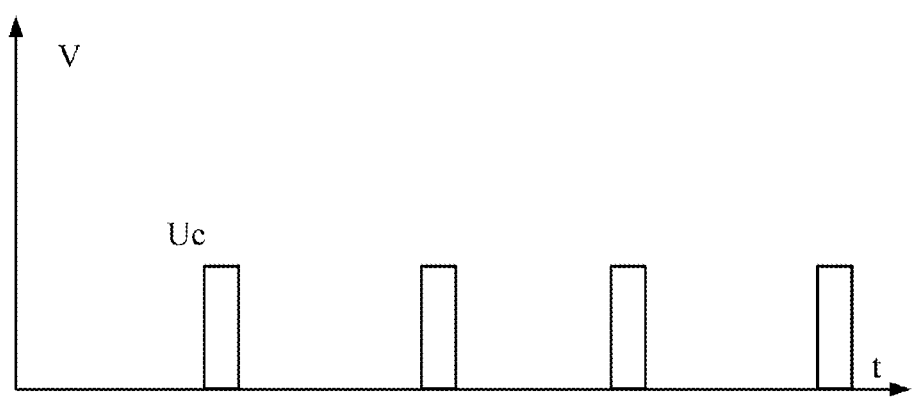

The zero detection circuit 210 includes a rectifier circuit 2101, a regulating circuit 2102, and a comparison circuit 2103. Referring also to FIGS. 3A-3C, the rectifier circuit 2101 receives the AC signal Ua from the AC input port 201 as shown in FIG. 3A, and rectifies the received AC signal to produce a rectified AC signal Ub only having positive semi-circle as shown in FIG. 3B. The regulating circuit 2102 is connected to the rectifier circuit 2101 and converts the rectified AC signals to DC (direct current) voltage. The comparison circuit 2103 is connected to the rectifier circuit 2101 and the regulating circuit 2102, and generates a reference voltage based on the DC voltage. And compares the reference voltage with the voltage of the rectified AC signals, and produces the interrupt signal when the reference voltage is greater than the voltage of the rectified AC signals, then the comparison circuit 2103 outputs periodical interrupt signals Uc as shown in FIG. 3C.

In detail, the comparison circuit 2103 includes a comparator A1, a voltage port Vcc, and resistors R1 and R2 which are connected between the voltage port Vcc and ground in series. The comparator A1 includes a non-inverting input port P1, an inverting input port N1, and an output port out 1. The non-inverting input port P1 is connected to a connection point R of the resistors R1 and R2, the inverting input port N1 is connected to the rectifier circuit 2101, the output port out1 is connected to the interrupt pin T of the processing unit 220, and the inverting input port N1 is also connected to the ground via a resistor R3.

The voltage port Vcc is connected to the regulating circuit 2102 to obtain the DC voltage produced by the regulating circuit 2102. The connection point R of the resistors R1 and R2 constitutes a reference port for producing the reference voltage, and then the non-inverting input port P1 connected to the connection point R obtains the reference voltage. It is easy to know, the reference voltage is equal to Vcc*R2/(R1+R2), in the embodiment, the reference voltage is a very small voltage, such as 1 volt. The comparator A1 compares the reference voltage with the voltage of the rectified AC signal Ub, and outputs a high voltage interrupt signal when the reference voltage is greater than the voltage of the rectified AC signal Ub. Because the reference voltage is very small, the comparator A1 compares the reference voltage that is greater than the rectified AC signal Ub only if the rectified AC signal Ub is nearly zero. Namely, the comparator A1 outputs the high voltage interrupt signal when the voltage of the AC signal Ub is zero. Then the comparator A1 outputs a periodical plus signal Uc as shown in FIG. 3C.

As described above, during the time that the processing unit 220 receives sixteen continuous interrupt signals selected from the predetermined number of interrupt signals, the processing unit 220 receives a bit data every two interrupt signals, and turns on or turns off the switch circuit 230 according to the bit value of the received data. Then the sender controller 20 outputs the AC current reflecting the data via the output port 202.

Figure 4:
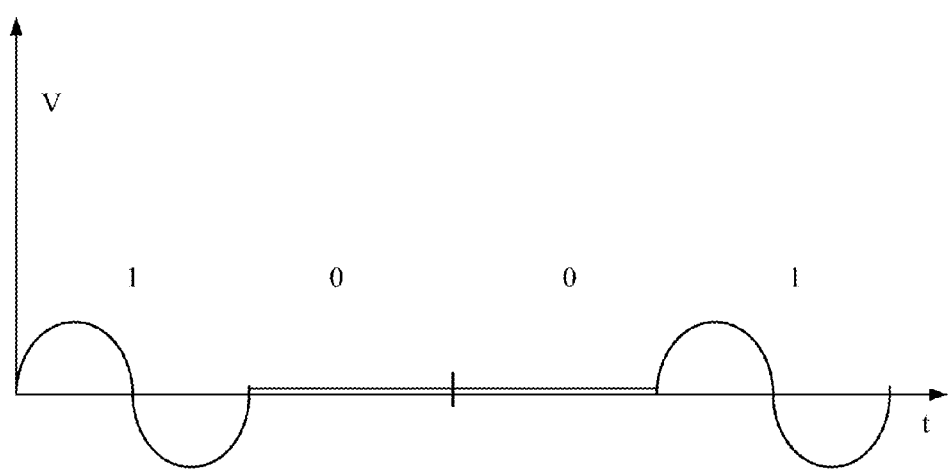
FIG. 4 is a schematic graph showing an alternating current output by the sender controller of FIG. 2.

Referring also to FIG. 4, a relationship between the data obtained by the processing unit 220 and the AC signals output via the output port 202 is illustrated. Suppose that the first four bits of a byte of data obtained by the processing unit 220 is "1001", then in a first cycle T1, the switch circuit 203 is turned on under the control of the processing unit 220, the AC signal output from the AC power source 50 is output via the output port 202. In the second and the third cycles, the switch circuit 203 is turned off under the control of the processing unit 220, then no AC signal is output via the output port 202. In the fourth cycle, the switch circuit 203 is turned on under the control of the processing unit 220, the AC signal output from the AC power source 50 is output via the output port 202. Therefore, if the bit value of a bit obtained by the processing unit 220 is "1", the AC signal output from the AC power source 50 is output via the output port 202, if the bit value of a bit obtained by the processing unit 220 is "0", the output port 202 does not output any AC signals.

In the embodiment, the zero detection circuit 210 also includes a diode D1 and a capacitor C1, the diode D1 and the capacitor C1 is connected between an input port (not labeled) of the regulating circuit 2102 and the ground. The capacitor C1 is charged when the rectifier circuit 2101 outputs voltage, and is discharged for providing power for the regulating circuit 2102 when the rectifier circuit 2101 does not output voltage, thereby ensuring the regulating circuit 2102 to maintain outputting the DC voltage.

In the embodiment, the switch circuit 230 is an optical coupler. The switch circuit 230 also includes another input terminal in2 which is connected to the ground via a resistor R4. Therefore, when the input terminal in1 is at high voltage, the switch circuit 230 is turned on, when the input terminal in1 is at low voltage, the switch circuit 230 is turned off. In other embodiments, the switch circuit 230 can be an NPN BJT or an NMOSFET, and the input terminal in1 corresponds to the base of the NPN BJT or the gate of the NMOSFET.

Figure 5:
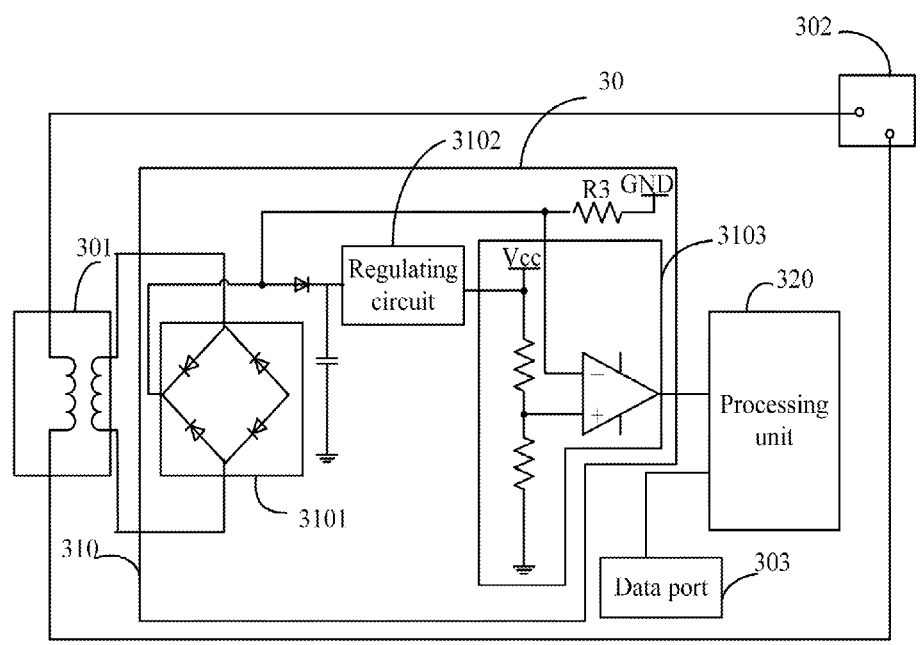
FIG. 5 is a circuit diagram of a receiver controller of the data transmission system of FIG. 1.

Referring also to FIG. 5, a circuit of the receiver controller 30 is illustrated. The receiver controller 30 includes the AC input port 301, the AC output port 302, the data port 303, a peak value detection circuit 310, and a processing unit 320. The AC input port 301 is connected to the AC output port 202 of the sender controller 20, and is used to receive the processed AC signal output by the sender controller 20. The output port 302 is connected to the receiver 40 for providing power for the receiver 40. The data port 303 is used to connect to the receiver 40 for transmitting data to the receiver 40. The peak value detection circuit 310 has the same structure as that of the zero detection circuit 210. Namely, the peak value detection circuit 310 includes a rectifier circuit 3101, a regulating circuit 3102, and a comparison circuit 3103. In the embodiment, the peak value detection circuit 310 is used to detect the peak point of the AC signal received by the AC input port 301.

Figure 6:
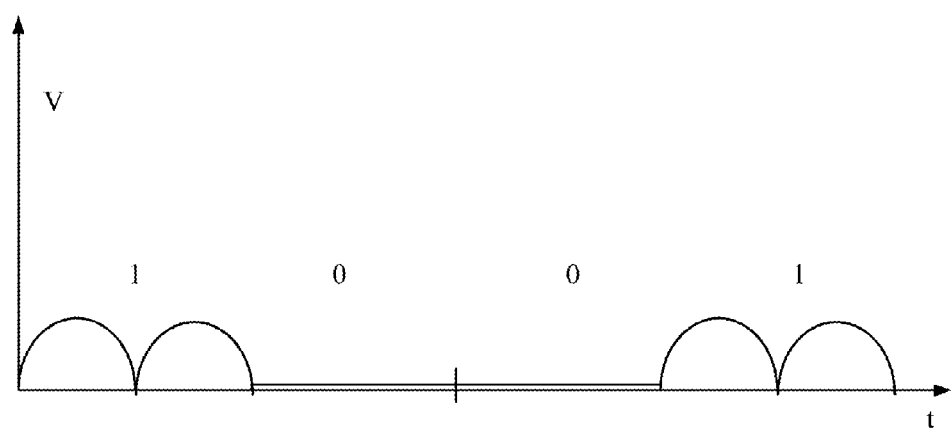
FIG. 6 is a schematic graph showing an alternating current processed by the receiver controller of FIG. 5.

The rectifier circuit 3101 rectifies the received AC signals to output a rectified AC signals only having positive semi-circle. Referring also to FIG. 6, if the AC signal output by the output port 202 reflects the data of "1001" as shown in FIG. 4, the rectifier circuit 3101 rectifies the received AC signals to produce a rectified AC signal only having positive semicircle as shown in FIG. 6.

Like the zero detection circuit 210, the regulating circuit 3102 is connected to the rectifier circuit 3101 and converts the rectified AC signals to DC (direct current) voltage. The comparison circuit 3103 is connected to the rectifier circuit 3101 and the regulating circuit 3102, and generates a reference voltage based on the DC voltage, and compares the reference voltage with the voltage of the rectified AC signals. In addition, produces a high voltage signal when the reference voltage is greater than the voltage of the rectified AC signal, and produces a low voltage signal when the reference voltage is lower than the voltage of the rectified AC signal. In the embodiment, the reference voltage generated by the comparison circuit 3103 is a relative high voltage, such as 100 volts.

As shown in FIG. 6, if the AC signal output by the AC output port 202 reflects the bit value of the data is "1". That means that there is at least one peak point of one cycle of the received AC signal, then the comparison circuit 3103 outputs at least one low voltage signal; if the AC signal output by the AC output port 202 reflects the bit of the data is "0". That means that there is no peak point of one cycle of the received AC signal, then the comparison circuit 3103 does not output the low voltage signal.

The processing unit 320 is connected to the comparison circuit 3103, and determines the bit value is "1" if receiving at least one low voltage signal of one cycle from the comparison circuit 3103, and determines the bit value is "0" if not receiving any low voltage signal of one cycle from the comparison circuit 3103. Then the processing unit 320 determines each bit value of the data in sequence, and outputs the data to the corresponding receiver 40 via the data port 303.

In the embodiment, the data output to the receiver 40 can be image files, audio files, video files, or control signal for controlling the receiver 40 to shut down, or start up.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A data transmission system based on a power line, comprising:
   a sender;
   at least one receiver;
   a sender controller comprising a first AC (Alternating current) input port, a first data port, and a first AC output port, the sender controller being configured for connecting to an AC power source and receiving an AC signal from the AC power source via the first AC input port, and connecting to the sender and receiving data from the sender via the first data port, and processing the received AC signal according to the received data, and outputting a processed AC signal reflecting the data via the AC output port, wherein, the sender controller controls the AC output port to output the AC signal or stop outputting the AC signal according to bit values of the received data, thus to produce the processed AC signal reflecting the data; and
   a receiver controller comprising a second AC input port, a second data port, and a second AC output port, the receiver controller being configured for receiving the processed AC signal from the sender controller via the second AC input port, connecting to the at least one receiver and powering the at least one receiver using the processed AC signal via the second AC output port, and converting the processed AC signal to corresponding data and transmitting the data to the at least one receiver via the second data port.

2. The data transmission system according to claim 1, wherein the sender controller further comprises:
   a switch circuit connected between the first AC input port and the first AC output port;
   a zero detection circuit configured for detecting zero points of the AC signal received from the AC power source, and producing an interrupt signal when detecting a zero point; and
   a first processing unit comprising an interrupt pin, a data pin, and a control pin; the processing unit being configured to connect to the zero detection circuit to receive the interrupt signal via the interrupt pin, and connect to the first data port and receive the data from the sender via the data pin, and connect to an input terminal of the switch circuit via the control pin;
   wherein, the first processing unit obtains a bit of data via the data pin every two interrupt signals are received by the interrupt pin, and outputs a high voltage or low voltage via the control pin according to the bit value of the received bit of data, turns on or turns off the switch circuit accordingly, and the first AC output port outputs the AC signal or stops outputting the AC signal in response to an on state or off state of the switch circuit, thereby the processed AC signal reflecting the data is produced.

3. The data transmission system according to claim 2, wherein the first processing unit detects whether the data pin receives data from the first data port if the interrupt pin receives the interrupt signal, and receives a bit data every two interrupt signals are received during the first processing unit receives sixteen continuous interrupt signals selected from a predetermined number of interrupt signals if the data pin receives data, and outputs an on signal to the input terminal of the switch circuit to turn on the switch circuit if the bit value of the received bit is "1", and outputs an off signal to the input terminal of the switch circuit to turn off the switch circuit if the bit value of the received bit is "0".

4. The data transmission system according to claim 2, wherein the zero detection circuit comprises:
   a rectifier circuit, configured for rectifying the received AC signal to produce a rectified AC signal only having positive semicircle;
   a regulating circuit; configured for connecting to the rectifier circuit and converting the rectified AC signals to DC (direct current) voltage; and
   a comparison circuit connected to the rectifier circuit and the regulating circuit, the comparison circuit being configured for generating a reference voltage based on the DC voltage, and comparing the reference voltage with the voltage of the rectified AC signal, and producing the interrupt signal when the reference voltage is greater than the voltage of the rectified AC signal.

5. The data transmission system according to claim 4, wherein the comparison circuit comprises a comparator, a voltage port, and a first resistor and a second resistor connected between the voltage port and ground in series; the comparator comprises a non-inverting input port, an inverting input port, and an output port; the non-inverting input port is connected to a connection point of the first resistor and the second resistor, the inverting input port is connected to the rectifier circuit, the output port is connected to the interrupt pin of the processing unit.

6. The data transmission system according to claim 5, wherein the voltage port is connected to the regulating circuit to obtain the DC voltage, the connection point of the first resistor and the second resistor constitutes a reference port for producing the reference voltage to the non-inverting input port; the comparator compares the reference voltage with the voltage of the rectified AC signal, and outputs a high voltage interrupt signal when the reference voltage is greater than the voltage of the rectified AC signal.

7. The data transmission system according to claim 4, wherein the switch circuit is an optical coupler which further comprises another input terminal connected to ground via a third resistor.

8. The data transmission system according to claim 4, wherein the switch circuit is an NMOSFET or an NPN BJT.

9. The data transmission system according to claim 2, wherein the receiver controller further comprises:
- a peak value detection circuit comprising:
  - a rectifier circuit, configured for rectifying the received processed AC signal to produce a rectified AC signal only having positive semicircle;
  - a regulating circuit; configured for connecting to the rectifier circuit and converting the rectified AC signal to DC (direct current) voltage; and
  - a comparison circuit connected to the rectifier circuit and the regulating circuit, the comparison circuit being configured for generating a reference voltage based on the DC voltage, and comparing the reference voltage with the voltage of the rectified AC signal, and producing a high voltage signal when the reference voltage is greater than the voltage of the rectified AC signal, and producing a low voltage signal when the reference voltage is lower than the voltage of the rectified AC signal; and
- a second processing unit connected to the comparison circuit, the second processing unit being configured for determining the bit value is "1" if receiving at least one low voltage signal from the comparison circuit of one cycle of the AC signal output by the AC power source, and determining the bit value is "0" if not receiving any low voltage signal from the comparison circuit of one cycle of the AC signal output by the AC power source, then determines each bit value of the data.

10. The data transmission system according to claim 9, wherein the data received by the second processing unit is a control signal for controlling the at least one receiver.

11. The data transmission system according to claim 9, wherein the data received by the second processing unit are image files, audio files, or video files.

12. A data transmission system based on a power line, comprising:
- a sender;
- at least one receiver;
- a sender controller comprising a first AC (Alternating current) input port, a first data port, a first AC output port, a switch circuit, a zero detection circuit, and a first processing unit comprising an interrupt pin, a data pin, and a control pin; the sender controller being configured for connecting to an AC power source and receiving an AC signal from the AC power source via the first AC input port, and connecting to the sender and receiving data from the sender via the first data port; the switch circuit being connected between the first AC input port and the first AC output port, the zero detection circuit being configured for detecting zero points of the AC signal received from the AC power source and producing an interrupt signal when detecting a zero point; the first processing unit being configured to connect to the zero detection circuit to receive the interrupt signal via the interrupt pin, and connect to the first data port and receive the data from the sender via the data pin, and connect to an input terminal of the switch circuit via the control pin; wherein, the first processing unit obtains a bit of data via the data pin every two interrupt signals are received by the interrupt pin, and outputs a high voltage or low voltage via the control pin according to the bit value of the received bit of data, turns on or turns off the switch circuit accordingly, and the first AC output port outputs the AC signal or stops outputting the AC signal in response to an on state or off state of the switch circuit, thereby a processed AC signal reflecting the data is produced; and
- a receiver controller comprising a second AC input port, a second data port, and a second AC output port, the receiver controller being configured for receiving the processed AC signal from the sender controller via the second AC input port, connecting to the at least one receiver and powering the at least one receiver using the processed AC signal via the second AC output port, and converting the processed AC signal to corresponding data and transmitting the data to the at least one receiver via the second data port.

13. The data transmission system according to claim 12, wherein the first processing unit detects whether the data pin receives data from the first data port if the interrupt pin receives the interrupt signal, and receives a bit data every two interrupt signals are received during the first processing unit receives sixteen continuous interrupt signals selected from a predetermined number of interrupt signals if the data pin receives data, and outputs an on signal to the input terminal of the switch circuit to turn on the switch circuit if the bit value of the received bit is "1", and outputs an off signal to the input terminal of the switch circuit to turn off the switch circuit if the bit value of the received bit is "0".

14. The data transmission system according to claim 12, wherein the zero detection circuit comprises:
- a rectifier circuit, configured for rectifying the received AC signal to produce a rectified AC signal only having positive semicircle;
- a regulating circuit; configured for connecting to the rectifier circuit and converting the rectified AC signals to DC (direct current) voltage; and
- a comparison circuit connected to the rectifier circuit and the regulating circuit, the comparison circuit being configured for generating a reference voltage based on the DC voltage, and comparing the reference voltage with the voltage of the rectified AC signal, and producing the interrupt signal when the reference voltage is greater than the voltage of the rectified AC signal.

15. The data transmission system according to claim 14, wherein the comparison circuit comprises a comparator, a voltage port, and a first resistor and a second resistor connected between the voltage port and ground in series; the comparator comprises a non-inverting input port, an inverting input port, and an output port; the non-inverting input port is connected to a connection point of the first resistor and the second resistor, the inverting input port is connected to the rectifier circuit, the output port is connected to the interrupt pin of the processing unit.

16. The data transmission system according to claim 15, wherein the voltage port is connected to the regulating circuit to obtain the DC voltage, the connection point of the first resistor and the second resistor constitutes a reference port for producing the reference voltage to the non-inverting input port; the comparator compares the reference voltage with the voltage of the rectified AC signal, and outputs a high voltage interrupt signal when the reference voltage is greater than the voltage of the rectified AC signal.

17. The data transmission system according to claim 14, wherein the switch circuit is an optical coupler which further comprises another input terminal connected to ground via a third resistor.

18. The data transmission system according to claim 14, wherein the switch circuit is an NMOSFET or an NPN BJT.

19. The data transmission system according to claim 12, wherein the receiver controller further comprises:

a peak value detection circuit comprising:
- a rectifier circuit, configured for rectifying the received processed AC signal to produce a rectified AC signal only having positive semicircle;
- a regulating circuit; configured for connecting to the rectifier circuit and converting the rectified AC signal to DC (direct current) voltage; and
- a comparison circuit connected to the rectifier circuit and the regulating circuit, the comparison circuit being configured for generating a reference voltage based on the DC voltage, and comparing the reference voltage with the voltage of the rectified AC signal, and producing a high voltage signal when the reference voltage is greater than the voltage of the rectified AC signal, and producing a low voltage signal when the reference voltage is lower than the voltage of the rectified AC signal; and a second processing unit connected to the comparison circuit, the second processing unit being configured for determining the bit value is "1" if receiving at least one low voltage signal from the comparison circuit of one cycle of the AC signal output by the AC power source, and determining the bit value is "0" if not receiving any low voltage signal from the comparison circuit of one cycle of the AC signal output by the AC power source, then determines each bit value of the data.

20. The data transmission system according to claim 19, wherein the data received by the second processing unit is a control signal for controlling the at least one receiver.

* * * * *